United States Patent [19]

Kobayashi et al.

[11] Patent Number: 4,871,799

[45] Date of Patent: Oct. 3, 1989

[54] THERMOPLASTIC POLYMER COMPOSITION

[75] Inventors: Shigeo Kobayashi, Ootsu; Takashi Nishida, Kyoto, both of Japan

[73] Assignee: Toyo Boseki Kabushiki Kaisha, Osaka, Japan

[21] Appl. No.: 246,016

[22] Filed: Sep. 14, 1988

Related U.S. Application Data

[63] Continuation of Ser. No. 922,908, Oct. 24, 1986, abandoned.

[30] Foreign Application Priority Data

Oct. 28, 1985 [JP] Japan .................................. 60-241812

[51] Int. Cl.$^4$ ........................ C08L 67/00; C08L 77/00
[52] U.S. Cl. ...................................... 525/64; 525/66; 525/92
[58] Field of Search ............................ 525/64, 66, 92

[56] References Cited

U.S. PATENT DOCUMENTS

| | | | |
|---|---|---|---|
| 4,296,216 | 10/1981 | Sakano et al. | 525/66 |
| 4,381,371 | 4/1983 | Nielinger et al. | 525/66 |
| 4,429,076 | 1/1984 | Saito et al. | 525/66 |
| 4,588,765 | 5/1986 | Beever | 525/66 |

*Primary Examiner*—Allan M. Lieberman
*Assistant Examiner*—A. Carrillo
*Attorney, Agent, or Firm*—Armstrong, Nikaido, Marmelstein, Kubovcik & Murray

[57] ABSTRACT

A thermoplastic polymer composition containing (a) a polyester or polyamide thermoplastic polymer and (b) a block graft copolymer which comprises (i) as the backbone portion at least one of a block copolymer or a hydrogenated block copolymer containing blocks of a styrene-type polymer and blocks of a butadiene-type polymer, and (ii) as the graft portion a radical disintegrative polymer, said block graft copolymer having been chemically modified with molecular units containing a functional group which will combine or interact with said thermoplastic polymer a). The thermoplastic polymer composition is superior in flexibility, resistance to chemicals and oil, impact resistance, moldability and elasticity.

8 Claims, No Drawings

THERMOPLASTIC POLYMER COMPOSITION

This application is a continuation of application Serial No. 922,908 filed Oct. 24, 1986, now abandoned.

The present invention relates to excellent thermoplastic polymer compositions which are superior in flexibility, chemical resistance, oil resistance, impact resistance and moldability and have elastomeric elasticity, and which are widely usable as automobile parts, various machine parts, etc.

Hitherto, among thermoplastic polymers, particularly polyamide resins find a great demand as engineering plastics because of their excellent characteristics. The field of their applications, however, has been limited because of their poor impact resistance, flexibility, etc.

Thus, there have been proposed many methods to improve the impact resistance, flexibility, etc. of the polyamide resins, for example the following methods to impart flexibility to the resins: adding a plasticizer in large amounts; using special polyamide resins such as nylon 12, copolymers of various nylons, polyamide elastomers, etc.; mixing a polymer having rubber-like elasticity; and mixing and reacting a polymer having rubber-like elasticity to which have been bonded molecular units having a functional group which can react with thermoplastic polymers (refer to U.S. Pat. No. 4,427,828).

In the foregoing prior-art techniques, the addition of plasticizers has a defect that the plasticizer bleeds out to lose flexibility upon use over long periods of time or at high temperatures. On the other hand, nylon 12, copolymers of various nylons, polyamide elastomers, etc. are very expensive as compared with other engineering plastics, so that their use is limited at present.

Also, in the methods of mixing a polymer having rubber-like elasticity, when the mixed system is not accompanied by reaction, there appear sink marks after molding as well as a reduction in various mechanical characteristics and durability characteristics. While, when the mixed system is accompanied by reaction, the moldability is poor because of the high melt viscosity, the moldability becoming a serious problem, and as a result, production of thin or large-sized molded products is impossible. Further, common molded products also have a defect that renders them as final products in terms of surface property, gloss, coloration, etc.

The present inventors extensively studied the system in question wherein a thermoplastic polymer is mixed and reacted with a polymer having rubber-like elasticity with the object of controlling high melt viscosity affecting the moldability to improve the fluidity, and as a result, completed the present invention. The present invention provides a thermoplastic polymer composition characterized in that said composition contains (a) a thermoplastic polymer having polar functional groups, and (b) a block.graft copolymer which comprises (i) as the backbone (or trunk) portion a block copolymer consisting of blocks of a vinyl-substituted aromatic compound polymer and blocks of a conjugated diene compound polymer and/or the hydrogenated product of said block copolymer, and (ii) as the graft portion a radical disintegrative polymer, said block.graft copolymer having been chemically modified with molecular units containing a functional group which will combine with or interact with said thermoplastic polymer (a).

The term "thermoplastic polymer having a polar functional group" as used herein refers to thermoplastic polymers having a melting point of from 150° to 300° C. and at least one polar functional group selected from the group consisting of a carboxyl, hydroxy and amino groups at the terminal. For example, there may be mentioned polyethylene terephthalate, polypropylene terephthalate, polybutylene terephthalate, polycyclohexane dimethylene terephthalate, polyoxyethoxybenzoate, polyethylene naphthalate; polyesters which are obtained by copolymerization of the components of the above polyesters with other acid components and/or glycol components, said acid components including for example isophthalic acid, p-oxybenzoic acid, adipic acid, sebacic acid, glutaric acid, diphenylmethanedicarboxylic acid, dimer acid, etc., and said glycol components including for example hexamethylene glycol, diethylene glycol, neopentyl glycol, bisphenol A, neopentyl glycol/alkylene oxide adducts, etc.; polyesters in a broad sense such as aromatic polyester.polyether block copolymers, aromatic polyester.polylactone block copolymers, polyarylate, etc.; and polyamides such as nylon 6, nylon 4,6, nylon 6,6, nylon 6,9, nylon 6,10, nylon 6,12, nylon 6/6,6, polyxylylene adipamide, polyhexamethylene terephthalamide, polyphenylene phthalamide, polyxylylene adipamide/hexamethylene adipamide, polyesteramide elastomers, polyetheramide elastomers, polyamides having dimer acid as a comonomer, etc. These thermoplastic polymers may be used alone or in blends of a plural number of them or in copolymers thereof. Particularly, those having a melting point of not lower than 200° C. are preferred in terms of thermal resistance. Generally, it is preferred for the above polyester resins to have an intrinsic viscosity of not less than 0.4, particularly not less than 0.5, as measured at a temperature of 30° C. in a phenol/tetrachloroethane mixed solvent (weight ratio, 6:4). Also, it is preferred for the polyamides to have a relative viscosity of, generally, not less than 1.8, particularly not less than 2.0, as measured in 98% sulfuric acid according to JIS K 6810-1970.

The block copolymer which is the backbone portion of the modified block.graft copolymer of the present invention is obtained preferably by hydrogenating a block copolymer comprising polymer blocks composed mainly of vinyl-substituted aromatic compounds and conjugated diene compounds. The vinyl-substituted aromatic compound constituting the block copolymer before hydrogenation includes styrene, α-methylstyrene, vinyltoluene, etc., among which styrene is particularly preferred. The conjugated diene compound constituting the same includes butadiene, isoprene, 1,3-pentadiene, etc., among which butadiene and isoprene are particularly preferred. The hydrogenation of the conjugated diene compound is carried out so that the degree of unsaturation is not more than 20%, preferably not more than 10%. The copolymerization ratio of the vinyl-substituted aromatic compound to the conjugated diene compound before hydrogenation is 5:95 to 60:40 by weight ratio, particularly preferably 10:90 to 30:70 by weight ratio.

The radical disintegrative polymer which is the graft portion of the modified block.graft copolymer refers to a polymer having such a property that: In the presence of radicals, the polymer itself disintegrates into smaller molecules by the cleavage of molecular chains in preference to the re-bonding and crosslinking of broken molecules. Specifically, there may be mentioned homopolymers such as polyisobutylene, polypropylene, poly-α-methylstyrene, polymethacrylate, polymethacrylamide, polyvinylidene chloride, celluloses, cellulose derivatives, polytetrafluoroethylene, polytrifluorochloroethylene, etc.; and copolymers such as butyl rubber obtained by copolymerization of polyisobutylene with 1 to 3% of isoprene, ethylene/propylene copolymers, etc. Among these, butyl rubber is particularly preferred.

The mixing ratio of the block copolymer to the radical disintegrative polymer is prferably 20:1 to 1:2.

In the present invention, the block.graft copolymer is modified by chemically bonding it to molecular units containing a functional group which will combine with or interact with the foregoing thermoplastic polymers (hereinafter referred to as modifier). Specifically, said block.graft copolymer is modified by addition reaction of the copolymer with a molecular unit containing a carboxyl, sulfonic or amino group or a derivative thereof, for example an unsaturated carboxylic acid or its derivative. The unsaturated acid or its derivative includes for example unsaturated dicarboxylic acids such as maleic acid, acrylic acid, methacrylic acid, α-ethylacrylic acid, fumaric acid, itaconic acid, citraconic acid, crotonic acid, tetrahydrophthalic acid, methyltetrahydrophthalic acid, cis-4-cyclohexene-1,2-dicarboxylic acid endo-cis-bicyclo[2.2.1]-5-heptene-2,3-dicarboxylic acid, etc., and their derivatives such as acid halides, amides, imides, acid anhydrides, esters, etc.

The amount of the foregoing modifier blended is not less than 0.02 wt. %, preferably 0.1 to 2 wt. % based on the total amount of the block copolymer and the radical disintegrative polymer.

In the present invention, for obtaining the modified block.graft copolymers, there is a method of melt blending a mixture of the block copolymer, radical disintegrative polymer and the modifier, or if necessary, the further addition of a radical generator. The radical generator includes for example the well-known organic peroxides, diazo compounds, etc. Specifically, there may be mentioned benzoyl peroxide, dicumyl peroxide, di-tert-butyl peroxide, tert-butylcumyl peroxide, tert-butyl hydroperoxide, cumene hydroperoxide, azobisisobutyronitrile, etc. The amount of the radical generator used is not less than 0.05 wt. %, preferably 0.1 to 1.5 wt. % based on the total amount of the block copolymer and radical disintegrative polymer.

For obtaining the thermoplastic polymer compositions of the present invention, there may be employed any of the methods of melt blending the thermoplastic polymer and previously prepared modified block.graft copolymer, of melt blending a mix of the thermoplastic polymer, block.graft copolymer and modifier, and of carrying out previous modification by melt-kneading the thermoplastic polymer, block.graft copolymer and radical generator, followed by melt-kneading with addition of the modifier and radical generator.

When the compositions of the present invention are used to produce moldings to be metal-plated, it will suffice to blend the compositions with an inorganic filler of 10 to 60 wt. %, preferably 20 to 50 wt. % based on the whole compositions. For specific examples of the inorganic filler, there may be mentioned powders of magnesium silicate, calcium silicate, aluminum silicate, calcium carbonate, alumina, silica, titanium dioxide, ferrite, etc., and glass fibers. Among these inorganic fillers, powders of calcium silicate, aluminum silicate, magnesium silicate and silica are preferred, and powders of calcium silicate are particularly preferred. The average particle diameter of the powdery inorganic fillers is from 0.2 to 20 μ, particularly preferably from 0.8 to 4.0 μ. The diameter and length of the glass fibers are from 2 to 15 μ and from 1 to 4 mm, respectively, and the diameter is particularly preferably from 3 to 7 μ.

The compositions of the present invention may properly be blended with additives such as fibrous reinforcing agents, fillers, coloring agents, stabilizers and other auxiliaries to such a degree that their properties are not damaged.

The action of the present invention will be illustrated with reference to a case wherein polyamide is the thermoplastic polymer, a styrene/ethylene.butylene/styrene block copolymer (hereinafter referred to as SEBS) is the block copolymer, butyl rubber is the radical disintegrative polymer and maleic anhydride is the modifier.

First, by melt blending SEBS and butyl rubber in the presence of the radical generator, the following reaction may be considered to occur: Butyl rubber is disintegration-cleft to react with polymer radicals in SEBS, and as a result, grafting of butyl rubber to SEBS takes place to produce the block.graft copolymer. In this case, the butyl rubber, as disintegration-cleft and bonded to SEBS by grafting, is considered to act as if it is a plasticizer for SEBS because of its good compatibility with the EB phase of SEBS to improve the melt-fluidity of SEBS as well as increase the rubber-phase component thereof, as a result of which SEBS becomes more rubbery in nature.

Generally, by merely mixing the thermoplastic polymer with the block.graft copolymer, the melt-fluidity of the blend becomes good, but other various mechanical characteristics and durability characteristics such as chemical resistance, oil resistance, etc. largely lower. However, when the block.graft copolymer is modified with maleic anhydride, the modified copolymer reacts with a part of the terminal amino groups of polyamide (thermoplastic polymer) to form a uniform and well-compatible disperse phase, and as a result, it may be presumed that the blend can retain the various excellent properties of polyamide and besides acquire elastomeric elasticity owing to combination of improved melt fluidity with rubbery property.

The present invention will be illustrated more specifically with reference to the following reference examples, examples and comparative examples.

EXAMPLES 1 AND 2 AND COMPARATIVE EXAMPLES 1 TO 4

100 Parts by weight of SEBS, a hydrogenated block copolymer, (Kraton G-1657; a product of Showa Shell Chemical Co.) and butyl rubber, a radical disintegrative polymer, (Butyl 065; a product of Nippon Synthetic Rubber Co.), maleic anhydride and dicumyl peroxide in the respective amounts shown in Table 1, were mixed and then melt blended and reacted on a 40 mmφ single-screw extruder in which the cylinder temperature was set at 220° C. to obtain modified block.graft copolymers A to E. In this case, the copolymer E was prepared using SEBS previously modified with maleic anhydride.

TABLE 1

| Composition (part by weight) | A | B | C | D | E |
|---|---|---|---|---|---|
| SEBS | 100 | 100 | 100 | 100 | 100 |

TABLE 1-continued

| Composition (part by weight) | A | B | C | D | E |
|---|---|---|---|---|---|
| Butyl rubber | 100 | — | 100 | 100 | 100 |
| Maleic anhydride | 0.5 | 0.5 | — | — | — |
| Dicumyl peroxide | 0.7 | 0.7 | 0.7 | — | — |

The modified block.graft copolymers A to E thus obtained were each mixed with polyamide in a proportion shown in Table 2, and melt blended and extruded into pellets at a cylinder temperature of 240° C. on a 30 mm$\phi$ twin-screw extruder. And the physical properties were measured, and the results are shown in Table 3.

The polyamide used in every example is nylon 6 having a relative viscosity of 2.53 (1 g of nylon/100 cc of 98% sulfuric acid, 25° C.), and it was vacuum-dried before use at 100° C. for 16 hours.

TABLE 2

| Composition (part by weight) | Example 1 | Example 2 | Comparative example 1 | Comparative example 2 | Comparative example 3 | Comparative example 4 |
|---|---|---|---|---|---|---|
| Polyamide | 40 | 60 | 60 | 60 | 60 | 60 |
| Modified block graft copolymer | A 60 | A 40 | B 40 | C 40 | D 40 | E 40 |

The polyamide compositions obtained by every example and comparative example in Table 2 were dried for 16 hours in a vacuum drier kept at a temperature of 70° C. and subjected to various physical property measurements described below. The results are shown in Table 3.

Tensile break strength:

Test pieces in the form of dumb-bell No.3 specified in JIS K 6301 were conditioned at room temperature for 16 to 24 hours before testing, and the test was conducted using a 20 mm span at a crosshead speed of 500 mm/min. The tensile break strength was calculated from the measurement values using the equations given in ASTM D 638.

Elongation at break:

The same procedure as above.

Melt-fluidity:

Test pieces were injection-molded, at an injection pressure of 1000 kg/cm$^2$ and a cylinder temperature of 250° C., into a snake flow mold kept at a temperature of 70° C., and the flow length was measured.

Melt viscosity:

According to the reference test in JIS K 7210, test was carried out on a Koka flow tester using a die of 1 mm in diameter and 10 mm in thickness and a load of 100 kg/cm$^2$.

Low-temperature impact resistance:

Test was carried out according to ASTM D-256-73. Samples were injection-molded at a temperature of 250° C. into the form of bars, 63.5 mm × 12.7 mm × 12.7 mm in size, be notched. Before testing, the bars thus obtained were conditioned at room temperature for 96 hours and then at −30° C. for 1 hour. Five bars were used for each test, and the result was expressed by a mean value.

Whitening upon stretching:

The test pieces in the form of dumb-bell No. 3 were folded at the center, and the degree of whitening at the bent portion was judged with naked eyes.

TABLE 3

| | Example 1 | Example 2 | Comparative example 1 | Comparative example 2 | Comparative example 3 | Comparative example 4 |
|---|---|---|---|---|---|---|
| Tensile break strength (kg/cm$^2$) | 195 | 210 | 236 | 186 | 143 | 190 |
| Elongation at break (%) | 280 | 250 | 230 | 47 | 27 | 40 |
| Hardness (JIS A) | 76 | 94 | 96 | 95 | 96 | 95 |
| Melt fluidity (mm/mm) | 67 | 92 | 49 | 108 | 102 | 70 |
| Melt viscosity (265° C.) (poise) | 1,700 | 1,100 | 12,000 | 600 | 500 | 5,000 |
| Low-temperature impact resistance (kg · cm/cm) | NB | NB | NB | 5.0 | 5.2 | 12.2 |
| Whitening upon stretching | Not observed | Not observed | Not observed | Observed | Observed | Observed |

As is apparent from Table 3, it can be seen that the compositions of the present invention in Examples 1 and 2 exhibit excellent melt fluidity and hardness, improved fluidity in a mold and good injection-moldability without whitening upon stretching, and besides that, in addition to these excellent properties, they have elastomeric properties of flexibility and high toughness. On the other hand, the composition in Comparative example 1 is inferior in melt fluidity, being poor in moldability, and the compositions in Comparative examples 2, 3 and 4, because of their simple mixed system accompanied by no reaction, are poor in both tensile break strength and elongation at break and also show whitening upon stretching.

EXAMPLES 3 TO 5

Modified block.graft copolymers were prepared in the same manner as in the foregoing examples except that the proportion of the materials was changed as shown in Table 4. Thereafter, in the same manner as in Example 2, 40 parts of each copolymer and 60 parts of the polyamide were mixed to prepare pellets, and the physical properties were measured using the pellets. The results are shown in Table 4.

TABLE 4

| | Example 3 | Example 4 | Example 5 | Example 2 |
|---|---|---|---|---|
| SEBS (part by | 180 | 130 | 70 | 100 |

TABLE 4-continued

| | | Example 3 | Example 4 | Example 5 | Example 2 |
|---|---|---|---|---|---|
| | weight) | | | | |
| Composition of modified block · graft copolymer | Butyl rubber (part by weight) | 20 | 70 | 130 | 100 |
| | Maleic anhydride (part by weight) | 0.5 | 0.5 | 0.5 | 0.5 |
| | Dicumyl peroxide (part by weight) | 0.7 | 0.7 | 0.7 | 0.7 |
| Tensile break elongation (%) | | 250 | 225 | 190 | 250 |
| Melt viscosity (poise) | | 4000 | 2000 | 600 | 1100 |
| Low-temperature impact resistance (kg · cm/cm) | | NB | NB | NB | NB |
| Melt fluidity (mm/mm) | | 73 | 82 | 95 | 92 |
| Whitening upon stretching | | Not observed | Not observed | Not observed | Not observed |

EXAMPLE 6

A composition of the present invention was prepared in completely the same manner as in Example 2 except that the amount of SEBS was changed to 160 parts by weight, and that 40 parts of polypropylene was used in place of butyl rubber. The physical properties of the composition obtained were as follows: Melt viscosity, 4000 cps; tensile break elongation, 180%; and low-temperature impact resistance, good (no break). Also, the composition was found to have excellent chemical resistance and oil resistance.

Effect of the Invention:

The thermoplastic polymer compositions constituted as above of the present invention are superior in both impact resistance and moldability, so that they are useful as engineering plastics, and in addition, they can be formed into fibers, films and sheets.

The polyamide resin compositions of the present invention are used, as engineering plastics having flexibility, thermal resistance, chemical resistance and mechanical properties, in wide applications ranging from extrusion-molded products (e.g. tubes, hoses, belts) to injection-molded products (e.g. sound-arresting gears). Also, the molded products obtained, even if deformed locally, show no reduction in physical properties owing to whitening at that portion, so that excellent molded products that have so far never been obtained are obtained.

What is claimed is:

1. A thermoplastic polymer composition which comprises:
   (a) a polyester or polyamide thermoplastic polymer; and
   (b) a block graft copolymer which comprises (i) as the backbone portion at least one of a block copolymer or a hydrogenated block copolymer consisting of blocks of a vinyl-substituted aromatic compound polymer in a weight range of 5 to 60 weight percent and blocks of a conjugated diene compound polymer in a range of 95 to 40 weight percent, and (ii) as the graft portion, a polymer which in the presence of radicals disintegrates into smaller molecules by the cleavage of molecular chains in preference to rebonding and crosslinking of broken molecules, said block graft copolymer having been chemically modified with molecular units containing a functional group which combines with or interact with said thermoplastic polymer (a), the block copolymer and the radical disintegrative polymer being in a ratio of 20:1 to 1:2 by weight.

2. The thermoplastic polymer composition as claimed in claim 1, wherein the thermoplastic polymer (a) is a polyamide.

3. The thermoplastic polymer composition as claimed in claim 1, wherein the molecular unit containing a functional group is maleic anhydride.

4. The thermoplastic polymer composition as claimed in claim 1, wherein the vinyl-substituted aromatic compound polymer is in a range of 10 to 30 weight percent and the conjugated diene compound is in a range of 90 to 70 weight percent.

5. The thermoplastic polymer composition as claimed in claim 1, wherein the thermoplastic polymer composition has a melting point of 150°–300° C.

6. The thermoplastic polymer composition as claimed in claim 5, wherein the thermoplastic polymer is a polyamide and has a relative viscosity of not less than 1.8 as measured in 98% sulfuric acid at 30° C.

7. The thermoplastic polymer composition as claimed in claim 1, wherein the radical disintegrative polymer is a member selected from the group consisting of: polyisobutylene, polypropylene, poly-α-methylstyrene, polymethacrylate, polymethacrylamide, polyvinylidene chloride, cellulose, cellulose derivatives, polytetrafluoroethylene, polytrifluorochloroethylene, butyl rubber and ethylene/propylene copolymers.

8. The thermoplastic polymer composition as claimed in claim 7, wherein the radical disintegrative polymer (ii) is a butyl rubber.

* * * * *